United States Patent
Yoo (10) Patent No.: US 7,213,960 B2
(45) Date of Patent: May 8, 2007

(54) BACKLIGHT UNIT ASSEMBLY USING LIGHT EMITTING DIODE ARRAY IN LIQUID CRYSTAL DISPLAY DEVICE

(75) Inventor: In Yong Yoo, Daegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 190 days.

(21) Appl. No.: 10/738,026

(22) Filed: Dec. 18, 2003

(65) Prior Publication Data

US 2004/0246696 A1    Dec. 9, 2004

(30) Foreign Application Priority Data

Dec. 24, 2002    (KR) .................... 10-2002-0083322

(51) Int. Cl.
*F21V 7/04*    (2006.01)
(52) U.S. Cl. .................... 362/634; 362/610; 362/612; 362/613; 362/615
(58) Field of Classification Search ............... 362/27, 362/613, 615–617, 621, 610, 634, 612
See application file for complete search history.

(56) References Cited

U.S. PATENT DOCUMENTS 5,040,098 A * 8/1991 Tanaka et al. ............... 362/634
2002/0163791 A1* 11/2002 Hoelen et al. ................ 362/31
2004/0070966 A1* 4/2004 Ahn et al. ..................... 362/31

* cited by examiner

*Primary Examiner*—Stephen F Husar
*Assistant Examiner*—Meghan K. Dunwiddie
(74) *Attorney, Agent, or Firm*—Morgan, Lewis & Bockius LLP (57) ABSTRACT

A backlight unit assembly using a light emitting diode array in a liquid crystal display device is disclosed in the present invention. The backlight unit assembly includes a light emitting diode array having a plurality of red, green, and blue light emitting diodes emitting respective light, a first housing concentrating the light emitted from the light emitting diode array to a first direction, a sub-light guiding plate positioned at one side of the light emitting diode array mixing the light to form white light, a main-light guiding plate guiding the light incident on the sub-light guiding plate to a second direction, and a pair of holders at the left and right side portions of the light emitting diode array preventing the light from leaking to the outside of the backlight unit assembly.

20 Claims, 5 Drawing Sheets

BACKLIGHT UNIT ASSEMBLY USING LIGHT EMITTING DIODE ARRAY IN LIQUID CRYSTAL DISPLAY DEVICE

This application claims the benefit of the Korean Patent Application No. P2002-083322 filed on Dec. 24, 2002, which is hereby incorporated by reference.

BACKGROUND OF THE INVENTION

1. Field of the Invention

The present invention relates to a liquid crystal display device, and more particularly, to a backlight unit assembly using a light emitting diode array in a liquid crystal display device. Although the present invention is suitable for a wide scope of applications, it is particularly suitable for providing uniform white light.

2. Discussion of the Related Art

Recently, a liquid crystal display (LCD) device has been widely used in that the LCD device obtains a high quality picture image due to the improvement of liquid crystal and minute pixel processing technology as well as advantageous characteristics, such as thin profile, light weight, and low power consumption. Also, the application field of the LCD device has been continuously expanded.

Generally, an LCD module (herein after referred to as a liquid crystal module "LCM") includes an LCD panel having lower and upper glass substrates, and liquid crystal injected between the upper and lower substrates, lower and upper polarizing plates on lower and upper surfaces of the LCD panel for polarizing light, and a backlight unit having a light source for providing light to the LCD panel, and a light guiding plate. The LCM displays a video signal input from the external source. Also, the LCD device includes a driving part for driving the LCM, and a system case.

Figure 1:
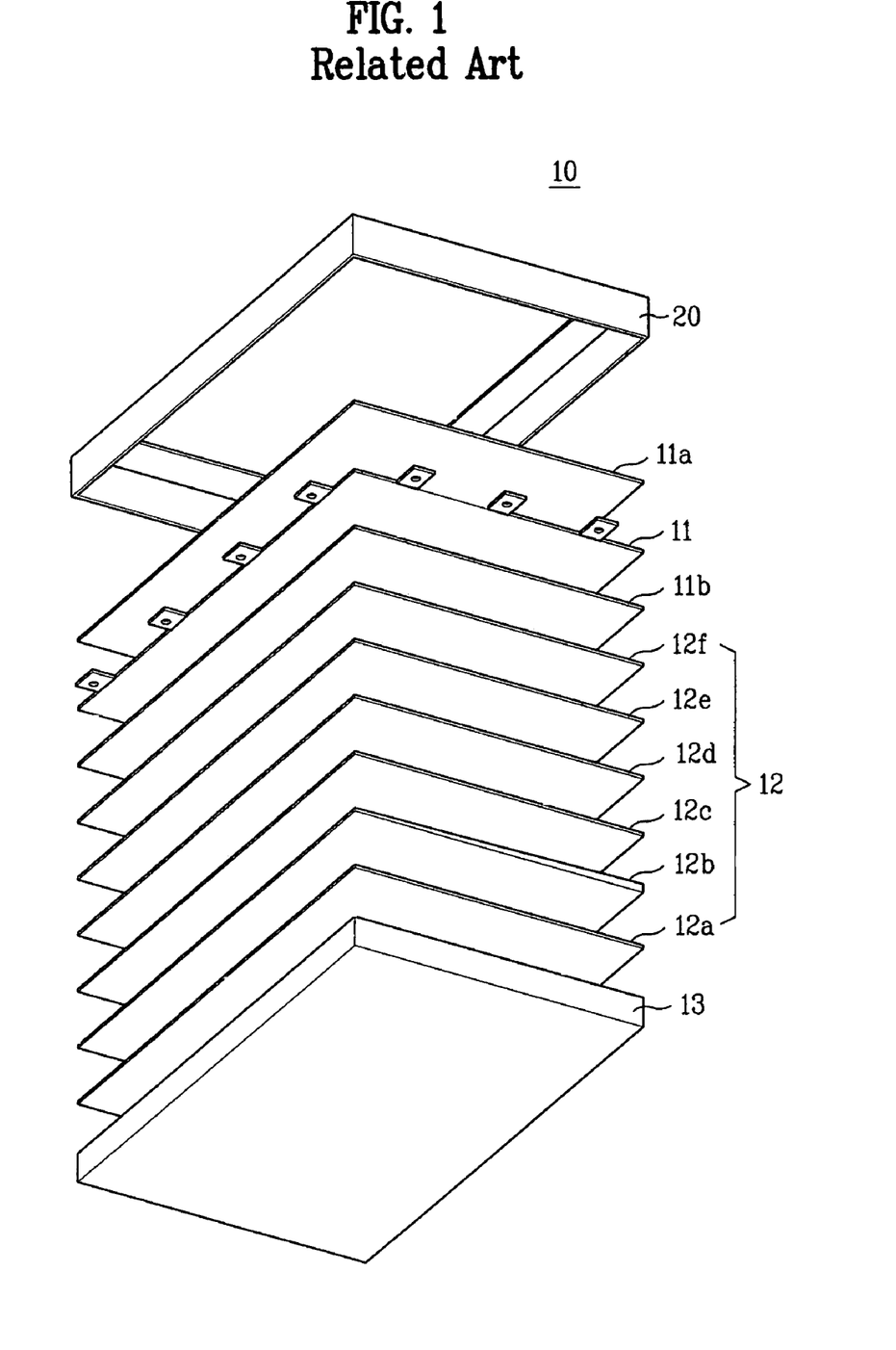
FIG. 1 is an expanded perspective view of the related art liquid crystal module (LCM)

FIG. 1 is an expanded view illustrating the related art LCM. As shown in FIG. 1, a related art LCM 10 includes a backlight unit 12 and an LCD panel 11. The backlight unit 12 and the LCD panel 11 are supported by a support main 13 and a top case 20. That is, a reflecting plate 12a, a light guiding plate 12b, a first diffusion or protection sheet 12c, a first prism sheet 12d, a second prism sheet 12e, and a second diffusion or protection sheet 12f are sequentially formed on the support main 13 of a plastic material, thereby forming the backlight 12. Then, the LCD panel 11 is deposited thereon. Meanwhile, the top case 20 of a metal material is connected to the upper side of the LCD panel 11, and the LCD panel 11 and the backlight unit 12 are supported by the support main 13. Also, an upper polarizing plate 11a is formed on the upper surface of the LCD panel 11, and a lower polarizing plate 11b is formed on the lower surface of the LCD panel 11.

Unlike a cathode ray tube (CRT) and a plasma display panel (PDP), the LCD panel 11 mounted on the LCD device requires an additional light source to emit light. That is, the LCD panel 11 controls the alignment of liquid crystal molecules by applying electrical fields. Thus, the LCD panel 11 additionally requires the backlight unit 12 for uniformly emitting light to the information display surface. Accordingly, the related art backlight unit uses one or more cold cathode fluorescent lamps (CCFL) as a light source.

Figure 2:
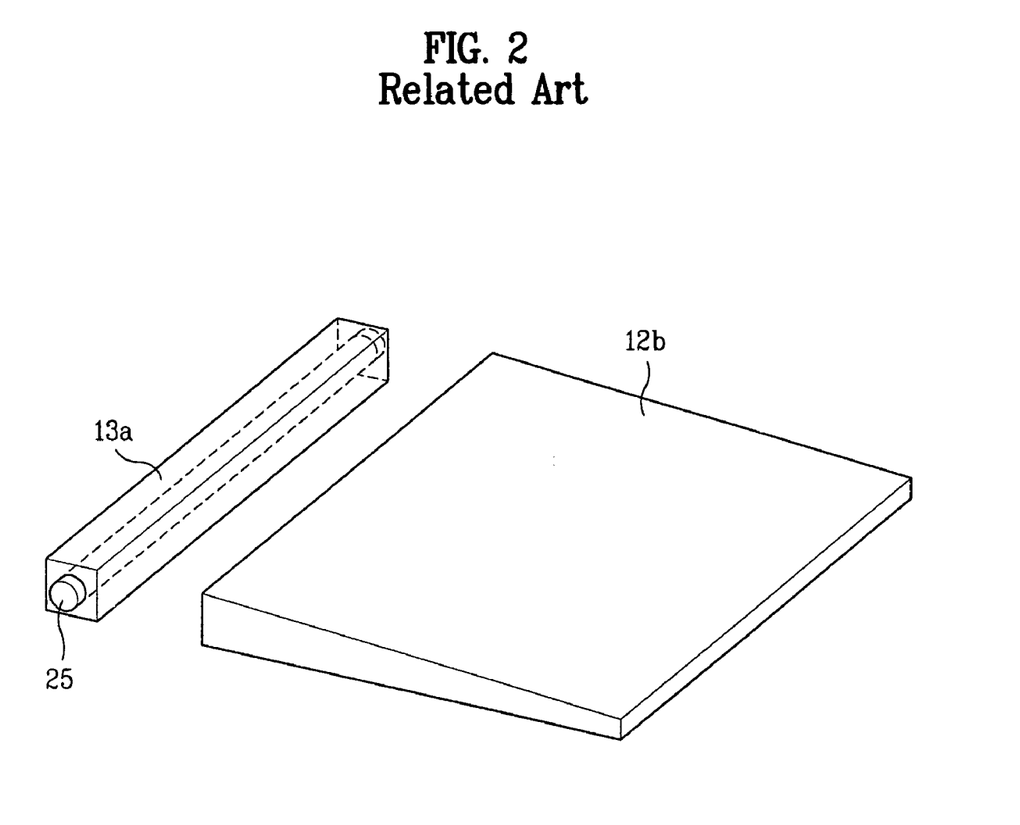
FIG. 2 illustrates the related art backlight unit.

In FIG. 2, a CCFL 25 is used as a light source of the backlight 2 in the related art LCM 10. As shown in FIG. 2, a receiving part 13a is provided in the support main (shown as 13 of FIG. 1) for receiving the CCFL 25, and the CCFL 25 is provided inside the receiving part 13a. The CCFL 25 is used as a light source. At this time, it is required to provide the light guiding plate 12b for guiding light to the LCD panel 11 since white light emitted from the CCFL 25 is diffused to all directions. For uniformly guiding the light emitted from the CCFL 25 to the LCD panel 11, the light guiding plate 12b gradually becomes thin as going to the opposite side of the end portion being in contact with the CCFL 25.

A fluorescent discharge tube is used for the CCFL 25 in order to utilize the penning effect, which is formed by injecting a hydrargyrum (Hg) gas containing argon (Ar) and neon (Ne) at a low pressure. Also, electrodes are formed at both ends of the fluorescent discharge tube, and the cathode is formed in a plate shape. When a voltage is applied thereto, electric charges inside the fluorescent discharge tube collide against the plate-shape cathode like a sputtering state, thereby generating secondary electrons. Accordingly, circumferential elements are excited by the secondary electrons, whereby plasma is generated. Also, the circumferential elements emit strong ultraviolet rays, and then the ultraviolet rays excite a fluorescent substance, thereby emitting visible rays.

In a backlight unit using the CCFL 25, the light source emits white light directly. However, if the backlight unit is used for a long time, it is difficult to maintain the emission of white light, thereby lowering a resolution and an efficiency in concentrating light. Also, it is hard to obtain the backlight unit having a high luminance due to size and capacity of the CCFL 25. Accordingly, it has been required to develop a light source having characteristics, such as high luminance, great resolution, low power consumption, and thin profile. In this respect, a light emitting diode (LED) has attracted great attention as the light source. The LED uses luminance when applying a voltage to a semiconductor. With the development of research and study for the LED, the LED begins to be applied to the LCD device as the light source.

Compared to the related art CCFL, the LED is miniaturized and has a long lifetime and low power consumption because it directly converts an electric energy to a light energy. Furthermore, the LED has a good luminous efficiency. Also, it is possible to obtain a high output power at a low current. In addition, the LED realizes a rapid response time, a high frequency modulation by pulse-operation, and an easy conversion of light output by controlling electric current.

Figure 3:
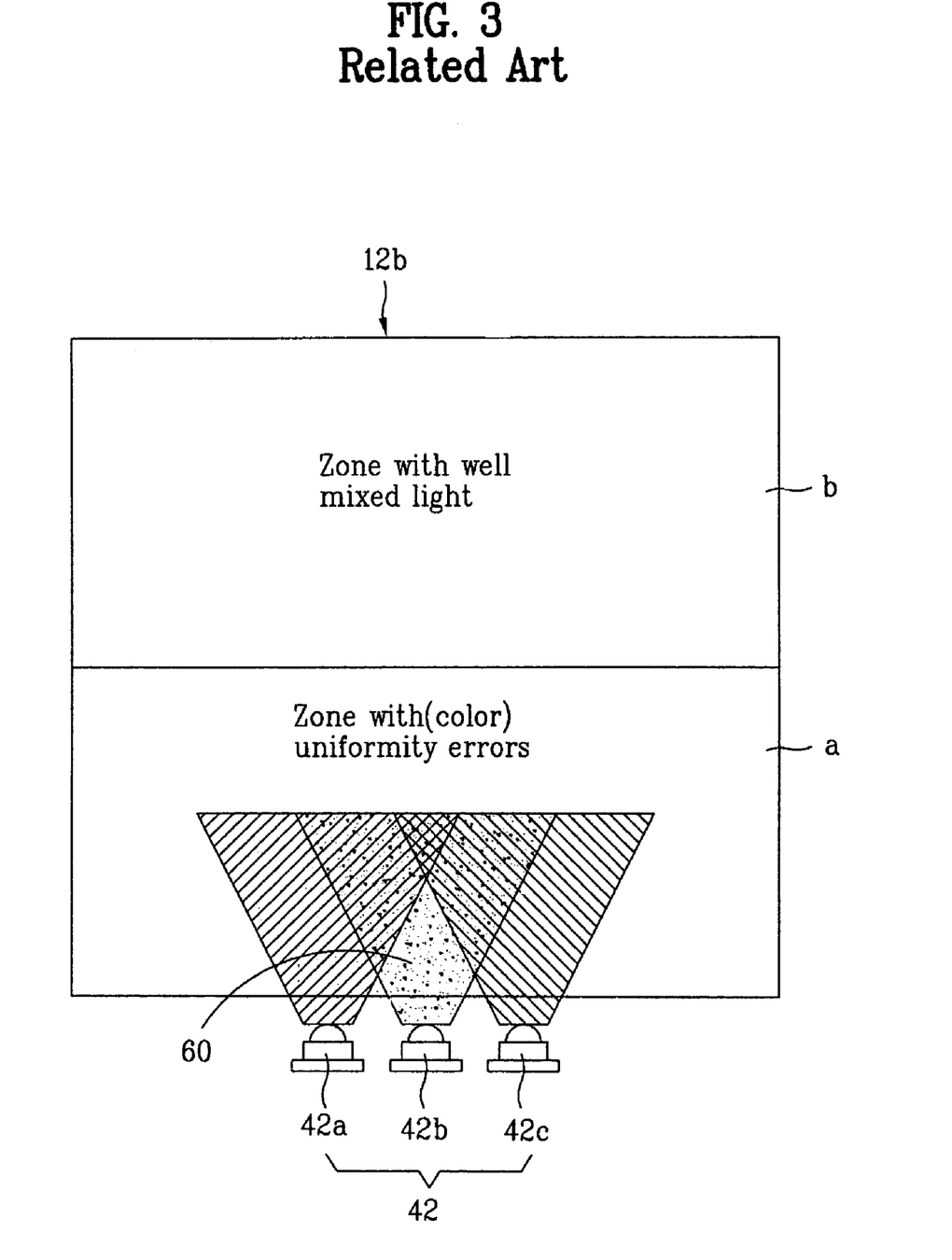
FIG. 3 illustrates the principle of generating white light in a sub-light guiding plate.

FIG. 3 illustrates the process for generating white light in a backlight unit using an LED array as a light source. As shown in FIG. 3, the backlight unit includes an LED array 42 and a housing (not shown). The LED array 42 includes a plurality of red (R), green (G), and blue (B) LEDs 42a, 42b, and 42c for decreasing power consumption, and the housing surrounding the LED array 42 concentrates the light emitted from the LED array 42 at one direction. The LED array 42 including a plurality of LEDs respectively emits monochromatic light. This is because a multi-color LCD device includes a color filter as well as an LCD panel and a backlight. That is, the multi-color LCD device uses the backlight of a fluorescent lamp having three wavelengths as a light source. That is, the white light emitted from the backlight is divided into three of red, green, and blue colors in the color filter, and the divided colors are mixed again to display various colors.

Generally, the LCD device has characteristics, such as a viewing angle at which a viewer can watch a screen, resolution for realizing colors of red (R), green (G), and blue (B) through the color filter with the transmitted light, luminance for brightness of a picture image, and a residual image remaining on the screen after one picture image is displayed on the screen for a long time. In case of using the LED as a light source, compared to a case for directly emitting the white light, it is useful to emit red (R), green (G), and blue (B) light, and to generate the white light by mixing the red (R), green (G), and blue (B) light, for obtaining a better resolution when applying the LED to an LCD device.

The color of the light source is determined according to chromaticity coordinates of the Commission International De L'eclairage (C.I.E.). That is, tristimulus values 'X', 'Y', and 'Z' are calculated from a spectrum of a predetermined light source, and then x, y, and z chromaticity coordinates of red, green, and blue are calculated according to the conversion matrix. Subsequently, x and y values of the red, green, and blue are expressed as rectangular coordinates, so that a U-shaped spectral locus is drawn, which is called the CIE chromaticity diagram. The general light source has the chromaticity coordinates inside the U-shaped spectral locus. At this time, a triangle space of the red, green, and blue chromaticity coordinates becomes a resolution space. As the triangle space becomes large, a resolution ratio becomes high. The resolution depends on color purity and luminance. As the color purity and the luminance become high, the resolution increases. Herein, the tristimulus values 'X', 'Y', and 'Z' indicate weight of a color-matching function approaching to one spectrum. Especially, 'Y' is a stimulus value to the brightness.

Meanwhile, a color temperature means a temperature of the hue of the white color according to the color change of the light emitted by the temperature of a heat source. On the monitor, the color temperatures appear as 9300K, 6500K, and 5000K. That is, the white light has different luminous intensity distributions on each wavelength even though a viewer recognizes the white light as one hue. For obtaining a better resolution by transmitting the white light through the color filter, it is more useful to mix the red (R), green (G), and blue (B) light by using the LEDs emitting respectively red (R), green (G), and blue (B) light than to use the LEDs directly emitting the white light, whereby the white light is easily generated.

As the color temperature becomes close to 9000K, the hue of the white color contains a blue color. When the color temperature is 6500K, the hue of the white color contains a red color. When the color temperature is 5000K, a neutral hue is generated. The color temperature is obtained from the chromaticity coordinates (x, y) of the white color. As the color temperature becomes close to 9000K, it satisfies the European broadcasting union (EBU) standard.

In case of the aforementioned LCD device, a luminous spectrum of the backlight is coupled with the color-matching function and a transmission spectrum of the color filter to determine the tristimulus values at each wavelength of the visible ray region. That is, in order to obtain the various colors, it is required to control a correlation between the backlight/color filter and the tristimulus values. In other words, the luminous spectrum of the backlight has to be controlled to optimize the resolution and the color temperature, and the transmission spectrum of the color filter has to be controlled to optimize luminosity.

To obtain the white color, it is necessary to simultaneously use the red (R), green (G), and blue (B) LEDs, thereby causing many problems in applications. Especially, in case of using the red (R), green (G), and blue (B) LEDs simultaneously, different colors emitted from the respective LEDs have to be mixed to generate the white color. In this case, it is required to emit the red (R), green (G), and blue (B) light from the LEDs having a predetermined luminous intensity.

Accordingly, the backlight unit using the LED array as a light source includes a light source part having a plurality of red (R), green (G), and blue (B) LEDs 42, and a light guiding plate 12b for mixing the light emitted from the light source part, and uniformly dispersing the white light to an LCD panel (not shown). When the LEDs 42 are used as light source, the respective LEDs 42 emit the red (R), green (G), and blue (B) light to generate the white light. However, in region "a" of the light guiding plate 12b, there is a portion 60 where the light emitted from the respective LEDs 42 is not mixed, whereby the white light is not generated in the portion 60. In region "b" of the light guiding plate 12b, the red (R), green (G), and blue (B) light emitted from the LEDs 42 is mixed to generate the white light. Thus, in the aforementioned backlight unit, it is required to transmit the white light generated in region "b" of the light guiding plate 12b to the LCD panel.

However, the backlight unit of the LCD device according to the related art has the following disadvantages.

In the related art backlight unit using the LED array as a light source, the light leaks at the side portion of the LED array. Even though the housing is provided in the related art backlight unit, it is difficult to concentrate the light to one direction, thereby lowering the luminance.

Also, in case the LED array is used as a light source, the red (R), green (G), and blue (B) light is respectively emitted from the LEDs of the LED array. In this case, the light emitted from the LED positioned at the side portion of the LED array leaks to the external, so that it is difficult to generate uniform white light, thereby lowering resolution of the LCD device.

SUMMARY OF THE INVENTION

Accordingly, the present invention is directed to a backlight unit assembly using a light emitting diode array in a liquid crystal display device that substantially obviates one or more of problems due to limitations and disadvantages of the related art.

Another object of the present invention is to provide a backlight unit assembly using a light emitting diode array in a liquid crystal display device for preventing light from leaking at the left and right sides of a light emitting diode array, thereby improving efficiency in generating uniform white light.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit assembly includes a light emitting diode array having a plurality of red, green, and blue light emitting diodes emitting respective light, a first housing concentrating the light emitted from the light emitting diode array to a first direction, a sub-light guiding plate positioned at one side of the light emitting diode array mixing the light to form white light, a main-light guiding plate guiding the light incident on the sub-light guiding plate to a second direction, and a pair of holders at the left and right side portions of the light emitting diode array preventing the light from leaking to the outside of the liquid crystal display device.

In another aspect of the present invention, a backlight unit assembly includes a light emitting diode array having a plurality of light emitting diodes emitting red, green, and blue light, a first housing coupled to the light emitting diode array and directing the emitted light to a first direction, and a pair of holders holding the first housing and at both sides to prevent a light leakage from the backlight unit assembly.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit assembly according to a first embodiment of the present invention will be described with reference to the accompanying drawings.

Figure 4:
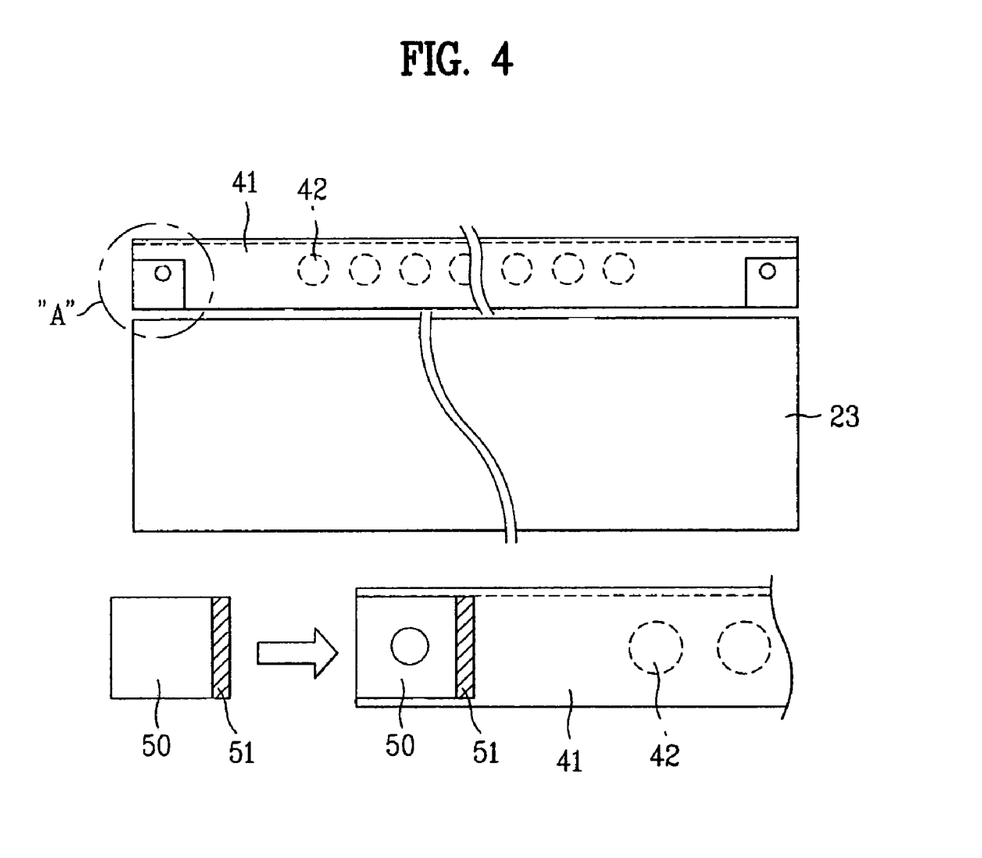
FIG. 4 illustrates a backlight unit using a light emitting diode (LED) array according to a first embodiment of the present invention.

FIG. 4 schematically illustrates a backlight unit assembly according to a first embodiment of the present invention. As shown in FIG. 4, in the backlight unit assembly, an LED array 41 is used as a light source. The LED array 41 includes a plurality of LEDs 42 emitting red (R), green (G), and blue (B) monochromatic light. Then, a sub-light guiding plate 23 is formed on the entire surface of the LED array 41, for mixing the red (R), green (G), and blue (B) monochromatic light to generate white light. Also, a holder 50 is provided at a side portion of the LED array 41, for preventing a light leakage.

In the related art LCM, a cold cathode fluorescent lamp (CCFL) is used as a light source. Meanwhile, in the backlight unit assembly according to the present invention, the LED array including the plurality of LEDs 42 is used as a light source, so that the entire structure of the backlight unit assembly is changed. Especially, it is necessary to prevent light from leaking in a housing covering the LED array 41. In this respect, the holder 50 is provided for preventing a light leakage. Accordingly, the backlight unit assembly according to the present invention is characterized in that the holders 50 are provided at the left and right sides of the LED array 41 for preventing a light leakage.

Figure 5:
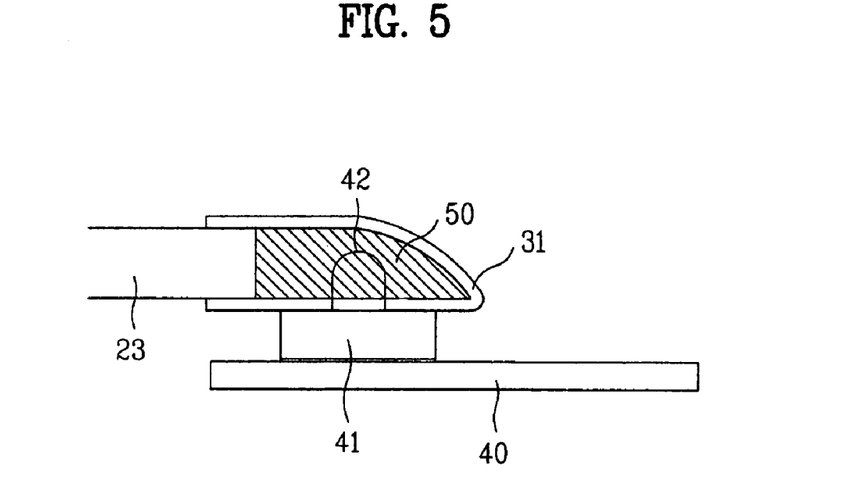
FIG. 5 is a cross-sectional view illustrating a backlight unit using a light emitting diode (LED) array according to the present invention.

FIG. 5 is a cross-sectional view illustrating the light emitting diode (LED) array according to the present invention. Referring to FIG. 5, a first housing 31 is provided for surrounding each LED 42. At this time, the first housing 31 has a predetermined curved line for concentrating light. Also, the first housing 31 is formed of a material such as MIRO at a thickness of about 0.5 millimeters (mm) since MIRO is hardly heated by visible or ultraviolet rays. That is, MIRO is suitable for the lamp housing. Furthermore, a reflecting layer is formed on the surface of MIRO, so that MIRO concentrates and reflects light, thereby improving the entire luminance of the backlight unit assembly. As elasticity becomes high, it is possible to make MIRO thin, so that MIRO is useful for the first lamp housing 31.

The light transmittance process will be described as follows. First, the red (R), green (G), and blue (B) light emitted from the respective LEDs 42 is concentrated by the first housing 31, and then is incident on the sub-light guiding plate 23. After that, the light is mixed as white light in the sub-light guiding plate 23. Also, the white light is incident on a main-light guiding plate (not shown), and is then uniformly transmitted to an LCD panel from the main-light guiding plate. For preventing the light generated in the LED array 41 from leaking at the side portion during the aforementioned process, the backlight unit assembly according to the present invention additionally includes the holder 50 for preventing a light leakage.

As shown in FIG. 5 illustrating the side portion of the backlight unit assembly, the first housing 31 surrounding each LED 42 is connected to the outside of the assembly. At this time, a minute interval may be generated between the support main and the backlight unit even though the support main (not shown) surrounds the backlight unit. Thus, the light may leak through the minute interval between the support main and the backlight unit. In this respect, the holder 50 is provided for preventing the light from leaking through the minute interval between the support main and the backlight unit.

At this time, the holder 50 is formed of silicon rubber. When the LED array 41 is used as a light source, light energy emitted from the LEDs 42 is changed to heat energy, so that the temperature becomes high at a side portion for mounting the holder 50. Accordingly, the holder 50 is formed of silicon rubber, for obtaining heat-resistance, and preventing damage according to heat-expansion caused by heat transmittance. In other words, since silicon rubber has high heat-resistance and chemical-resistance characteristics, it is not damaged at a high temperature. Also, even if the first housing 31 is expanded due to the heat-expansion, it is possible to prevent the light from leaking through the interval between the support main and the backlight unit by using the holder 50 of silicon rubber. In the present invention, the side portion of the holder 50 is formed in a shape corresponding to the first housing 31.

As shown in FIG. 5, a printed circuit substrate 40 is provided below the LED array 41 including the LEDs 42 for driving the LEDs 42. At this time, the first housing 31 surrounds the LED array 41, and the sub-light guiding plate 23 is connected to the first housing 31 at the front side of the first housing 31. From the side view, the first housing 31 is formed in a curved line, so that the holder 50 has a cross-sectional shape corresponding to the side shape of the first housing 31. Then, the holder 50 is inserted into the first housing 31 from the side portion of the LED array 41. That is, the holder 50 is formed for being corresponding to the side shape of the first housing 31, and the holder 50 is inserted into the first housing 31.

Inserting the holder 50 into the first housing 31 may be difficult due to friction between the holder 50 and the first housing 31. Thus, the cross-sectional shape of the holder 50 may be formed differently to decrease the friction during the inserting process. That is, the holder 50 obtains the cross-sectional shape having a size smaller than that of the side shape of the first housing 31 at an initial portion for inserting the holder 50 into the first housing 31. Then, the cross-section of the holder 50 is gradually increased, so that the holder 50 obtains the cross-sectional shape having a size larger than that of the side shape of the first housing 31 at an end portion for inserting the holder 50 into the first housing 31.

Also, the holder 50 has a reflecting plate attached on a surface directly exposed to the light emitted from the LEDs. That is, the reflecting plate 51 is provided on the surface facing the LEDs 42 of the holder 50, so that most of the light emitted from the LEDs 42 is reflected by the reflecting plate 51. Thus, it prevents the light from leaking at the side portion of the LED array 41 and realizes high luminance. Furthermore, the reflecting plate 51 is formed of a material such as MIRO having the aforementioned characteristics, whereby the reflecting plate 51 is formed thinly, and the reflecting plate 51 is hardly heated by visible or ultraviolet rays. That is, MIRO is suitable for the reflecting plate 51. However, it is possible to form the reflecting plate 51 of any material that is not heated by the light emitted from the LEDs 42.

Hereinafter, a backlight unit assembly according to a second embodiment of the present invention will be described as follows.

Figure 6:
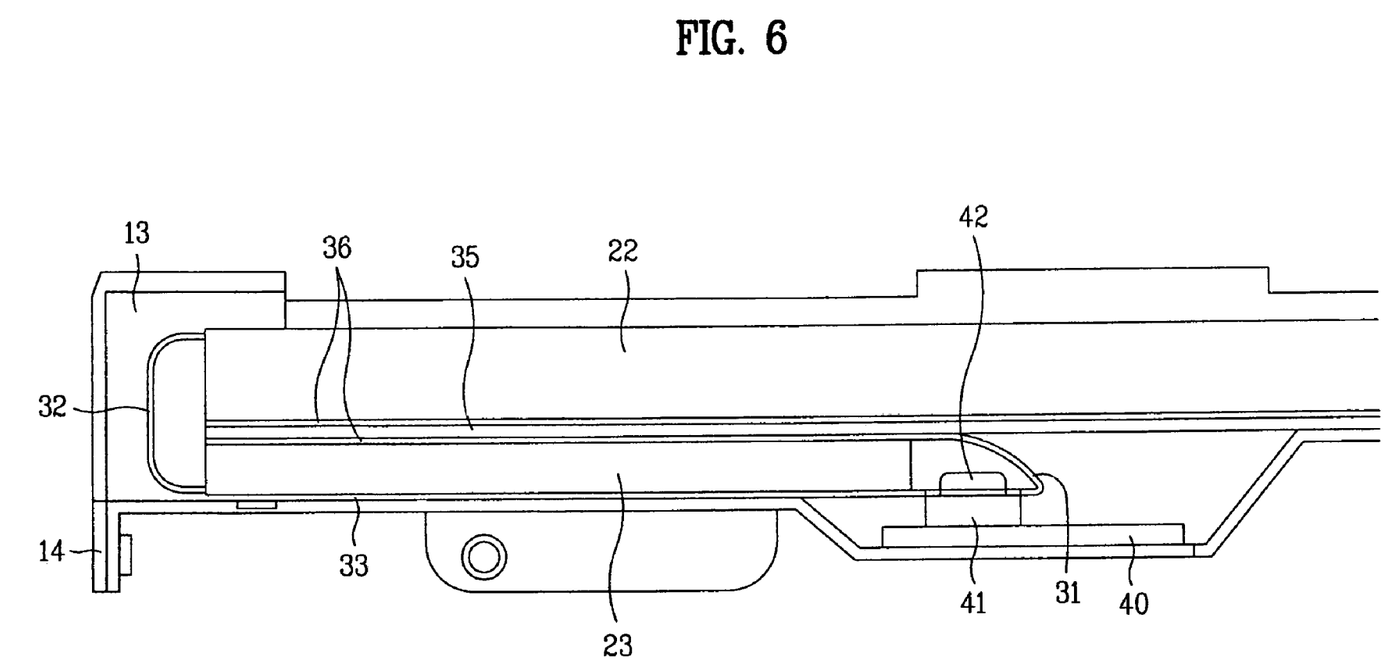
FIG. 6 illustrates a backlight unit having a main-light guiding plate on a sub-light guiding plate according to a second embodiment of the present invention.

FIG. 6 schematically illustrates a backlight unit assembly according to a second embodiment of the present invention. In the backlight unit assembly according to the second embodiment of the present invention, a main-light guiding plate 22 is provided on a sub-light guiding plate 23. That is, the backlight unit assembly according to the second embodiment of the present invention includes all components of the backlight unit assembly according to the first embodiment of the present invention. In addition, the backlight unit assembly according to the second embodiment of the present invention includes a second housing 32 for concentrating white light emitted from the sub-light guiding plate 23 on to the main-light guiding plate 22, and a back cover 35 between the sub-light guiding plate 23 and the main-light guiding plate 22, for preventing the light from being transmitted therebetween.

As shown in FIG. 6, an LED array 41 is used as a light source, and a first housing 31 surrounding the LED array 41 is provided for concentrating the light. Also, the sub-light guiding plate 23 is provided at the front side of the LED array 41, and the second housing 32 is provided at one end of the sub-light guiding plate 23. Then, the main-light guiding plate 22 is provided on the sub-light guiding plate 23. A backlight unit and an LCD panel are supported by a support main 13. The second housing 32 is comprised of a reflecting plate 51 for concentrating white light emitted from the sub-light guiding plate 23 on the main-light guiding plate 22. For improving efficiency, the second housing 32 is formed in a curved line. Also, a reflecting surface 33 is formed of a material such as MIRO on the lower surface of the sub-light guiding plate 23 for preventing light from leaking to the outside of the assembly. Then, the lower surface of MIRO is supported with a cover bottom 14 of a metal material. The cover bottom 14 supports the lowermost portion of the backlight unit. A portion of the cover bottom that accommodates the LED array 41 is projected to the rear-side direction for realizing thin and light backlight unit assembly.

Generally, the LED light source of the backlight unit includes the first housing 31, the LEDs 42, the LED array 41, and a printed circuit substrate 40 below the LED array 41. The LED light source is the thickest part in the backlight unit. In this respect, a portion of the cover bottom 14 corresponding to the LED array 41 is projected to the rear-side direction, so that it is possible to mount other components of the system at the rear side of the cover bottom 14 except for the projecting portion of the cover bottom 14, thereby realizing thin and light backlight unit assembly.

Also, as shown in FIG. 6, the LED array 41 and the sub-light guiding plate 23 are provided below one side of the main-light guiding plate 22. In addition, it is possible to mount another LED array and sub-light guiding plate below the opposite side of the main-light guiding plate 22. That is, two LED light sources are provided symmetrically below the main-light guiding plate 22. In the backlight unit assembly according to the second embodiment of the present invention, holders 50 are provided at both side portions of the LED array 41 for preventing a light leakage, thereby effectively mixing light.

The light transmittance process will be described as follows.

First, the light emitted from the respective LEDs 42 is concentrated on the first housing 31, and then is incident on the sub-light guiding plate 23. Thereafter, the mixed light becomes white light in the sub-light guiding plate 23, and then is emitted to the second housing 32. Subsequently, the light reflected from the second housing 32 is incident on the main-light guiding plate 22. Accordingly, the main-light guiding plate 22 uniformly emits the light to an LCD panel.

In the aforementioned structure, when the light leaks at a predetermined portion, luminance is lowered. Especially, if the light leaks to the external before the light mixing process in the sub-light guiding plate 23, the mixed light cannot be white, thereby lowering resolution. Accordingly, it is necessary to prevent a light leakage in the LED array 41 and the sub-light guiding plate 23. As mentioned in the first embodiment of the present invention, the holders 50 are provided at both sides of the LED array 41 to prevent a light leakage.

In order to prevent the light leakage in the sub-light guiding plate 23 and to form a light transmission passage, MIRO is provided to the lower surface of the sub-light guiding plate 23 and the first housing. Also, reflecting sheets 36 are provided on the lower and upper surfaces of the back cover 35, and both sides of the sub-light guiding plate 23. To form the light transmission passage, the second housing 32 is formed of MIRO. In the backlight unit assembly according to the present invention, the holders 50 are provided for preventing the light leakage to the outside of the assembly, thereby obtaining uniform white light in the sub-light guiding plate 23.

As mentioned above, the backlight unit assembly according to the present invention has the following advantages.

In the backlight unit using the LED array as the light source, if the red (R), green (G), and blue (B) light is emitted from respective LEDs of the LED array, the holders are provided in the first housing for preventing the light of the LED positioned at the side portion of the LED array from leaking to the outside of the assembly. Thus, the light is completely incident on the sub-light guiding plate, thereby obtaining uniform white light by improving efficiency in mixing light.

Also, the holders are provided for preventing the first housing from being connected to the external, so that the light is effectively concentrated without a light leakage, thereby obtaining high luminance. That is, in the backlight unit assembly according to the present invention, a light leakage in the LED array to the outside of the assembly is prevented, so that the light is readily mixed in the sub-light guiding plate, thereby improving efficiency in mixing the light and obtaining the uniform white light.

It will be apparent to those skilled in the art that various modifications and variations can be made in the backlight unit assembly using the light emitting diode array in the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A backlight unit assembly, comprising:
   a light emitting diode array having a plurality of red, green, and blue light emitting diodes emitting respective light;
   a first housing concentrating the light emitted from the light emitting diode array to a first direction;
   a sub-light guiding plate positioned at one side of the light emitting diode array mixing the light to form white light;
   a main-light guiding plate guiding the light incident on the sub-light guiding plate to a second direction; and
   a pair of holders arranged inside the first housing at the left and right side portions of the light emitting diode array to prevent the light from leaking to the outside of the backlight unit assembly.

2. The backlight unit assembly of claim 1, wherein the main-light guiding plate is located on the sub-light guiding plate.

3. The backlight unit assembly of claim 2, further comprising:
   a second housing concentrating the white light emitted from the sub-light guiding plate on the main-light guiding plate; and
   a back cover between the sub-light guiding plate and the main-light guiding plate preventing the light from being transmitted therebetween.

4. The backlight unit assembly of claim 1, wherein the holders are formed of silicon rubber.

5. The backlight unit assembly of claim 1, wherein each holder has a side shape matching a shape of the first housing.

6. The backlight unit assembly of claim 5, wherein each holder is inserted into the first housing from a side portion of the light emitting diode array.

7. The backlight unit assembly of claim 1, wherein each holder has a reflecting plate.

8. The backlight unit assembly of claim 7, wherein the reflecting plate is formed of a material which is hardly heated by visible or ultraviolet rays.

9. The backlight unit assembly of claim 7, wherein the reflecting plate is coupled to lower surfaces of the sub-light guiding plate and the first housing to provide a light transmission passage.

10. The backlight unit assembly of claim 3, further comprising reflecting sheets on lower and upper surfaces of the back cover, and both sides of the sub-light guiding plate to provide a light transmission passage.

11. The backlight unit assembly of claim 7, wherein the reflecting plate is coupled to the second housing to provide a light transmission passage.

12. A backlight unit assembly, comprising:
   a light emitting diode array having a plurality of light emitting diodes emitting red, green, and blue light;
   a first housing coupled to the light emitting diode array and directing the emitted light to a first direction; and
   a pair of holders arranged inside the first housing and at both sides to prevent a light leakage from the backlight unit assembly.

13. The backlight unit assembly of claim 12, further comprising:
   a first light guiding plate coupled to the light emitting diode array and mixing the emitted light from the light emitting diode array to form white light;
   a second light guiding plate located on the first light guiding plate and directing the mixed light from the first light guiding plate to a second direction; and
   a second housing concentrating the white light from the second light guiding plate.

14. The backlight unit assembly of claim 13, wherein the first light guiding plate is located on the second light guiding plate.

15. The backlight unit assembly of claim 13, wherein each holder has a reflecting plate.

16. The backlight unit assembly of claim 15, wherein the reflecting plate is formed of a material which is hardly heated by visible or ultraviolet rays.

17. The backlight unit assembly of claim 15, wherein the reflecting plate is coupled to lower surfaces of the second light guiding plate and the first housing to provide a light transmission passage.

18. The backlight unit assembly of claim 13, further comprising reflecting sheets at both sides of the second light guiding plate to provide a light transmission passage.

19. The backlight unit assembly of claim 15, wherein the reflecting plate is coupled to the second housing to provide a light transmission passage.

20. A backlight unit assembly, comprising:
   a light emitting diode array having a plurality of red, green, and blue light emitting diodes emitting respective light;
   a first housing concentrating the light emitted from the light emitting diode array to a first direction;
   a sub-light guiding plate positioned at one side of the light emitting diode array mixing the light to form white light;
   a main-light guiding plate guiding the light incident on the sub-light guiding plate to a second direction;
   a pair of holders at the left and right side portions of the light emitting diode array to prevent the light from leaking to the outside of the backlight unit assembly;
   a second housing concentrating the white light emitted from the sub-light guiding plate on the main-light guiding plate; and
   a back cover between the sub-light guiding plate and the main-light guiding plate preventing the light from being transmitted therebetween.

* * * * *